(12) United States Patent
Raffman et al.

(10) Patent No.: US 8,704,850 B2
(45) Date of Patent: Apr. 22, 2014

(54) TWO-DIMENSIONAL OBJECT PACKING

(75) Inventors: Andrew R. Raffman, Redmond, WA (US); Jesse Sage Schreiner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 12/873,045

(22) Filed: Aug. 31, 2010

(65) Prior Publication Data

US 2012/0050337 A1 Mar. 1, 2012

(51) Int. Cl.
- *G09G 5/00* (2006.01)
- *G06T 15/30* (2011.01)
- *G06T 11/40* (2006.01)
- *G06T 11/60* (2006.01)
- *G06F 17/21* (2006.01)

(52) U.S. Cl.
CPC .................. *G06T 15/30* (2013.01); *G06T 11/40* (2013.01); *G06T 11/60* (2013.01); *G06F 17/211* (2013.01); *G06F 17/212* (2013.01)
USPC ........... 345/622; 345/619; 345/629; 715/243; 715/768

(58) Field of Classification Search
CPC ......... G06T 15/30; G06T 11/40; G06T 11/60; G06F 17/211; G06F 17/212
USPC ................. 345/619, 629, 418–424, 426–427; 715/517, 781–788, 243
See application file for complete search history.

(56) References Cited

U.S. PATENT DOCUMENTS

| | | | |
|---|---|---|---|
| 5,267,177 A | 11/1993 | Sato et al. | |
| 6,208,439 B1 | 3/2001 | McArthur et al. | |
| 6,832,129 B2 | 12/2004 | Lesh et al. | |
| 6,954,291 B2 | 10/2005 | Klein et al. | |
| 7,177,488 B2 | 2/2007 | Berkner et al. | |
| 7,391,423 B1* | 6/2008 | Manzari et al. | 345/619 |
| 2003/0009728 A1* | 1/2003 | Marple | 716/2 |
| 2003/0080977 A1* | 5/2003 | Scott et al. | 345/629 |
| 2005/0071783 A1* | 3/2005 | Atkins | 715/851 |
| 2005/0188303 A1* | 8/2005 | Ayers et al. | 715/517 |
| 2007/0065044 A1* | 3/2007 | Park et al. | 382/305 |
| 2007/0186182 A1* | 8/2007 | Schiller | 715/781 |
| 2007/0234203 A1* | 10/2007 | Shagam et al. | 715/517 |
| 2008/0301548 A1* | 12/2008 | Sellers et al. | 715/273 |
| 2009/0002764 A1* | 1/2009 | Atkins et al. | 358/1.18 |

(Continued)

OTHER PUBLICATIONS

J.O. Berkey and P.Y. Wang, "Two-Dimensional Finite Bin-Packing Algorithms", J. Opl Res. Soc., vol. 38, No. 5, pp. 423-429, 1987.*

(Continued)

*Primary Examiner* — Jin-Cheng Wang
(74) *Attorney, Agent, or Firm* — Sung Kim; Andrew Sanders; Micky Minhas (57) ABSTRACT

Various embodiments enable visual elements or objects, such as two-dimensional raster images, to be packed into a bounding region, such as a rectangular bounding region, in a manner that reduces wasted space. In at least some embodiments, a two-dimensional object packing component attempts to fit individual objects into the bounding region. The two-dimensional object packing component utilizes a span list to keep track of available space by tracking spans within the bounding region. Spans can occur laterally-adjacent placed objects and/or adjacent a placed object's bottom edge. In one or more embodiments, the span list is sorted left-to-right, top-to-bottom.

20 Claims, 6 Drawing Sheets

(56) References Cited

U.S. PATENT DOCUMENTS

2009/0089660 A1* 4/2009 Atkins et al. .................. 715/243
2010/0275152 A1* 10/2010 Atkins et al. .................. 715/788
2012/0147046 A1* 6/2012 Chao ............................. 345/641

OTHER PUBLICATIONS

T.W. Leung, et. al., "Applications of genetic search and simulated annealing to the two-dimensional non-guillotine cutting stock problem", Computers & Industrial Engineering, vol. 40, pp. 201-214, 2001.*

Korf, Richard E., "Optimal Rectangle Packing: New Results", Retrieved at <<http://citeseerxist.psu.edu/viewdoc/download?doi=10.1.1.140.200&rep=rep1&type=pdf>> Published Date: 2004, pp. 8.

Chen, et al., "Two-Dimensional Packing for Irregular Shaped Objects", retrieved at <<http://citeseerxist.psu.edu/viewdoc/download?doi=10.1.1.68.8042&rep=rep1&type=pdf>> in the proceedings of the 36th Hawaii International Conference on System Sciences, Published Date: 2003, pp. 1-10.

Hopper, et al., "A Genetic Algorithm for a 2D Industrial Packing Problem", Retrieved at <<http://citeseerx.ist.psu.edu/viewdoc/download?doi=10.1.1.20.5364&rep=rep1&type=pdf>> in the proceedings of Computers and Industrial Engineering, vol. 37/1-2, Published Date: Oct. 1999, pp. 375-378.

Murata, et al., "VLSI Module Placement Based on Rectangle-Packing by the Sequence-Pair", Retrieved at <<http://citeseerkist.psu.edu/viewdoc/download?doi=10.1.1.111.8677&rep=rep1&type=pdf>> In the proceedings of IEEE Transactions on Computer-Aided Design of Integrated Circuits and Systems, vol. 15, No. 12, Dec. 1996, pp. 1518-1524.

"Foreign Office Action", CN Application No. 201110266360.2, Dec. 4, 2013, 16 Pages.

* cited by examiner

TWO-DIMENSIONAL OBJECT PACKING

BACKGROUND

A common task in the design of a user interface is to enable objects from a list of objects, such as an ordered list of objects of various sizes and aspect ratios, to be displayed within a bounding region. One challenge in implementing such a design is associated with formatting each object and laying out the objects in an efficient manner. Constraints in a typical implementation include reducing the waste of screen real estate associated with space between objects, reducing the loss of important information due to cropping objects, reducing the need to change the aspect ratio of an object in a way that can impact the perceived quality of the object, allowing the user interface control over the size of each object, maintaining, where appropriate, the order of objects within an ordered list to provide some control for relative priority, and maintaining the relative orientation of objects. In addition, design challenges continue to impose constraints associated with efficiently using CPU, memory, and other system resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable visual elements or objects, such as two-dimensional raster images, to be packed into a bounding region, such as a rectangular bounding region, in a manner that reduces wasted space. In at least some embodiments, a two-dimensional object packing component attempts to fit individual objects into the bounding region. The two-dimensional object packing component utilizes a span list to keep track of available space by tracking spans within the bounding region. Spans can occur laterally-adjacent placed objects and/or adjacent a placed object's bottom edge. In one or more embodiments, the span list is sorted left-to-right, top-to-bottom.

In at least some embodiments, the two-dimensional object packing component can utilize additional features to improve a user's experience. Such additional features include, by way of example and not limitation, a look-ahead feature, an object resizing feature, a drop-down feature, an object position redistribution feature, a facial recognition for context-sensitive cropping feature, a video feature, and/or a threshold tolerance and outcome measurement feature.

BRIEF DESCRIPTION OF THE DRAWINGS

The same numbers are used throughout the drawings to reference like features.

DETAILED DESCRIPTION

Overview

Various embodiments enable visual elements or objects, such as two-dimensional raster images, to be packed into a bounding region, such as a rectangular bounding region, in a manner that reduces wasted space. In at least some embodiments, a two-dimensional object packing component attempts to fit individual objects into the bounding region. The two-dimensional object packing component utilizes a span list to keep track of available space by tracking spans within the bounding region. Spans can occur laterally-adjacent placed objects and/or adjacent a placed object's bottom edge. In one or more embodiments, the span list is sorted left-to-right, top-to-bottom.

In at least some embodiments, the two-dimensional object packing component can utilize additional features to improve a user's experience. Such additional features include, by way of example and not limitation, a look-ahead feature, an object resizing feature, a drop-down feature, an object position redistribution feature, a facial recognition for context-sensitive cropping feature, a video feature, and/or a threshold tolerance and outcome measurement feature.

In the discussion that follows, a section entitled "Operating Environment" is provided and describes one environment in which one or more embodiments can be employed. Following this, a section entitled "Example Two-dimensional Object Packing" describes how two-dimensional objects can be packed in a bounding region in accordance with one or more embodiments. Next, a section entitled "Example Method" describes an example method in accordance with one or more embodiments. Following this, a section entitled "Look-ahead" describes an example feature in accordance with one or more embodiments. Next, a section entitled "Object Re-sizing" describes an example feature in accordance with one or more embodiments. Following this, a section entitled "Dropdown" describes an example feature in accordance with one or more embodiments. Next a section entitled "Object Position Re-distribution" describes an example feature in accordance with one or more embodiments. Following this, a section entitled "Facial Recognition for Context Sensitive Cropping" describes an example feature in accordance with one or more embodiments. Next, a section entitled "Video" describes an example feature in accordance with one or more embodiments. Following this, a section entitled "Threshold Tolerance and Outcome Measurement" describes an example feature in accordance with one or more embodiments. Last, a section entitled "Example System" describes an example system that can be utilized to implement one or more embodiments.

Operating Environment

Figure 1:
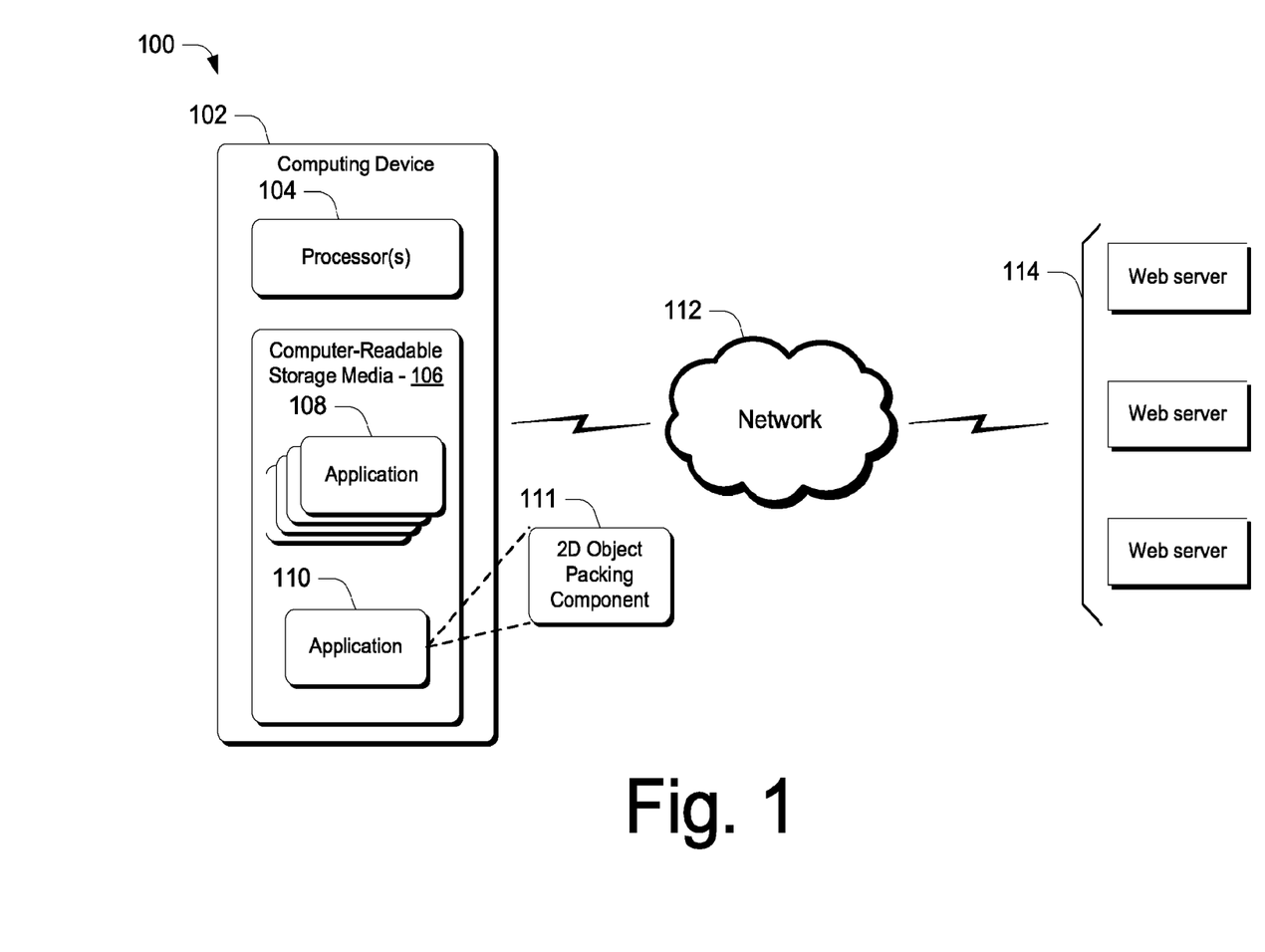
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

In addition, computing device 102 includes a software application 110 that includes a two-dimensional object packing component 111. Application 110 can comprise any suitable type of application that processes two-dimensional visual elements or objects such as two-dimensional raster images. Alternately or additionally, two-dimensional object packing component 111 can be a stand-alone component that is utilized by other components and/or applications.

In addition, environment 100 includes a network 112, such as the Internet, and one or more web servers 114 from and to which content can be received and sent, as described above and below. Such content can include content that includes two-dimensional visual objects as described above and below.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of some example embodiments that can utilize two-dimensional object packing as described above and below.

Example Two-Dimensional Object Packing

Figure 2:
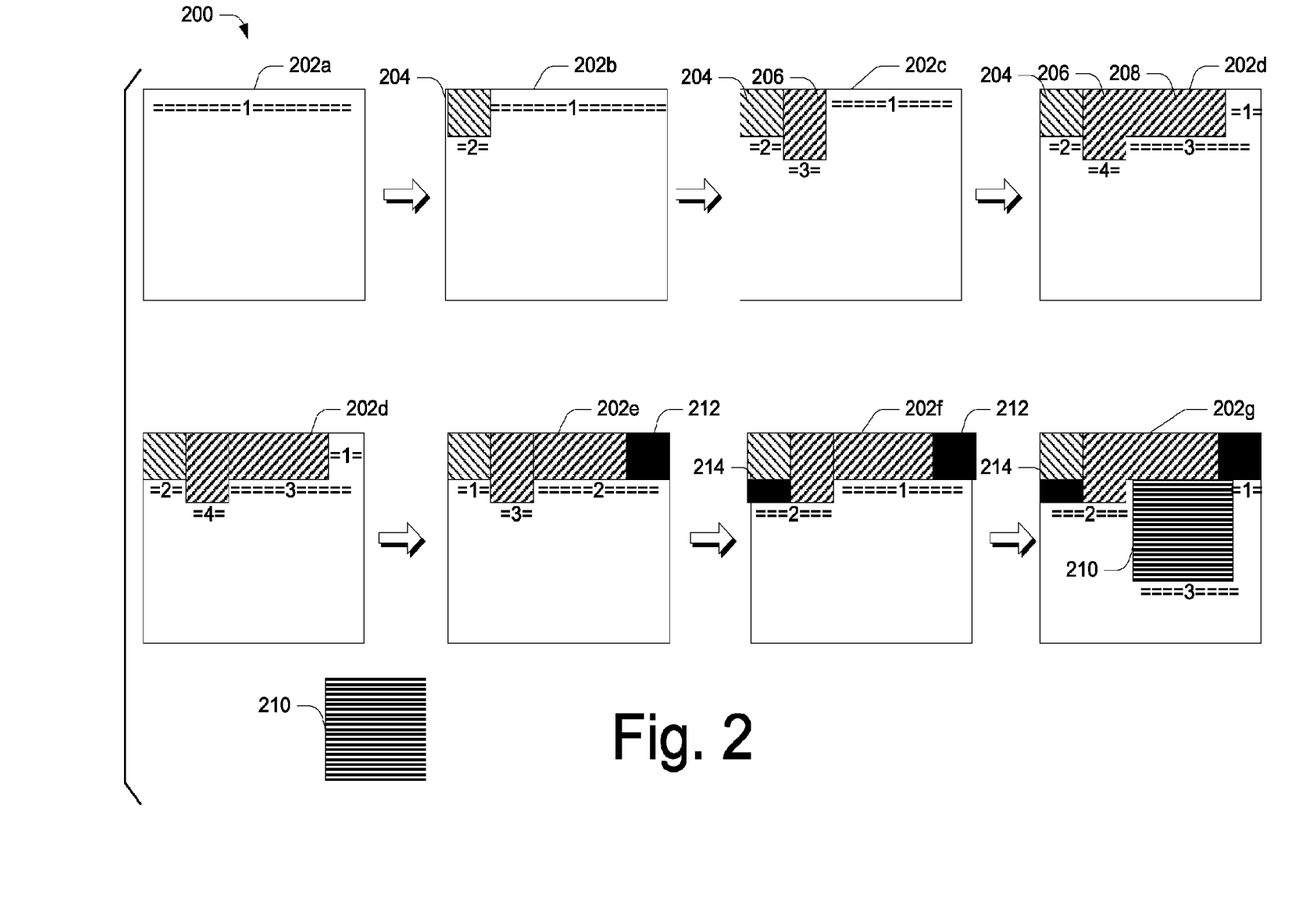
FIG. 2 illustrates an example two-dimensional object packing operation in accordance with one or more embodiments.

FIG. 2 illustrates an example two-dimensional object packing operation in accordance with one or more embodiments generally at 200. The packing operation can be implemented by a suitably-configured two-dimensional object packing component, such as the one described above. In the operation about to be described, a single bounding region, in various packing states, is illustrated at 202*a-g*.

Initially, a list of objects to be packed into the bounding region is obtained. The list of objects can be obtained from any suitable source or sources. For example, one or more objects can be obtained via a network, such as the Internet. Alternately or additionally, one or more objects can be obtained from a local source such as a local computing device. In addition, the objects can comprise any suitable type of two-dimensional object such as, by way of example and not limitation, a two-dimensional raster image. In addition, the list of objects can comprise an ordered list of objects such that the objects are attempted to be packed into the bounding region in the same order as the objects appear on the list.

In the illustrated and described embodiment, individual objects are attempted to be packed into the bounding region moving from left-to-right, and top-to-bottom. It is to be appreciated and understood, however, that any suitable packing order or direction can be utilized without departing from the spirit and scope of the claimed subject matter.

In the illustrated and described embodiment, available space within the bounding region is tracked. Any suitable method or structure can be utilized to track available space within the bounding region. In one or more embodiments, a list in the form of a span list is utilized to track available space. Spans can occur laterally-adjacent placed objects and/or adjacent a placed object's bottom edge. In one or more embodiments, the span list is sorted left-to-right, top-to-bottom. In the illustrated example, spans are represented as follows: "====n====", where "n" is a variable that represents the index, in the span list, of a particular span.

Initially, in one or more embodiments, bounding region 202*a* is empty and includes no objects. As illustrated, a single span designated "1" extends across the top of bounding region 202*a*. Alternately, however, the bounding region might include one or more reserved regions that result in multiple initial spans in the bounding region. Reserved regions can be used for things such as titles or other user interface-related chrome which is to be placed at well-defined locations.

A first object 204 to be placed within the bounding region is obtained and placed as shown in bounding region 202*b*. When the first object 202 is inserted, the first span is truncated as shown and a new, second span designated "2" is created along the bottom edge of first object 204. This process continues as long as there is available space within the first span.

Specifically, the next object to be placed within the boundary region is obtained and placed adjacent first object 204. In the illustrated and described example, a second object 206 has been placed adjacent first object 204 in bounding region 202*c*. As a result, the first span is truncated as shown and a third span, designated "3", is created along the bottom edge of second object 206. Next, a third object 208 is placed adjacent second object 206, thus further truncating the first span. Notice also that the span order in the span list is redefined. Specifically, because the vertical extent of third object 208 is the same as the vertical extent of first object 204, in the left-to-right, top-to-bottom span list sort, the span that is created along the bottom edge of third object 208 now becomes the third span. The bottom edge of second object 206 now becomes the fourth span as indicated by "4."

For continuity, the bounding region 202*d* is repeated in the second illustrated row. Assume in this example, that the next object to be placed within the bounding region is object 210. If there is no space left in the first span, as here, the first span is dropped down and merged with the next-adjacent span, designated "2" in bounding region 202*d*. This leaves an empty space referred to as an empty block. An example empty block is designated at 212 in bounding region 202*e*. In addition, the spans from bounding region 202*d* have been reordered in bounding region 202*e*, maintaining the left-to-right, top-to-bottom span list ordering. Now, object 210 is attempted to be placed within the first span in the bounding region 202*e*. Since object 210 cannot be placed within the first span in bounding region 202*e*, the first span is merged with the next-adjacent span designated "2" in bounding region 202*e*. This leaves another empty space that is occupied by an empty block.

Specifically, bounding region 202*f* illustrates empty block 214 that occupies the first span from bounding region 202*e*. Notice also that the span order has been redefined. Now, object 210 is attempted to be placed within the newly-defined first span in bounding region 202*f*. As shown in bounding region 202*g*, object 210 fits within the first span and correspondingly, causes the first span to be truncated. Notice also that a third span is created adjacent the bottom edge of object 210.

The above-described process continues until all the objects have been placed within the bounding region, or until the y-position of the first span is greater than the height of the bounding region, meaning that no more objects can fit within the bounding region.

Example Method

Figure 3:
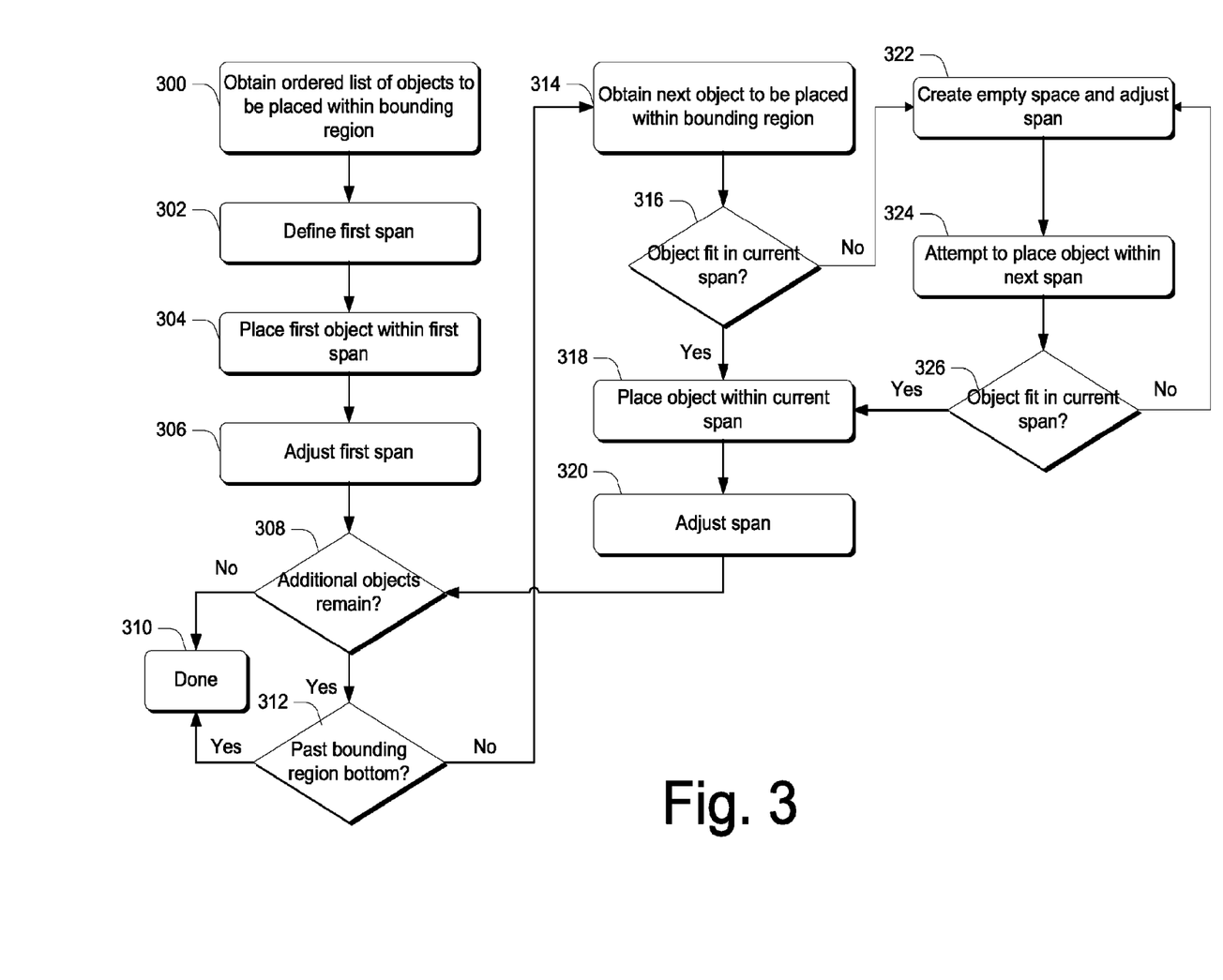
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof In at least some embodiments, the method can be implemented in software such as, by way of example and not limitation, by a two-dimensional object packing component such as the one described in connection with FIG. 1.

Step 300 obtains an ordered list of objects to be placed within a bounding region. The objects can be obtained from any suitable location examples of which are provided above.

In addition, any suitably-dimensioned bounding region can be utilized. In at least some embodiments, the bounding region can comprise a rectilinear bounding region such as, by way of example and not limitation, a rectangular bounding region. Step 302 defines a first span. An example of how this can be done is provided above. Step 304 places a first object within the first span. The 306 adjusts the first span responsive to placement of the object therein.

Step 308 ascertains whether additional objects remain to be placed within the bounding region. If there are no additional objects to be placed, step 310 terminates the method. If, on the other hand, additional objects remain to be placed, step 312 ascertains whether placement of those objects would extend past the bottom of the bounding region. If placing the additional object or objects would extend past the bottom of the bounding region, step 310 terminates the method. If not, step 314 obtains a next object to be placed within the bounding region. Step 316 ascertains whether the next object fits within the current span. If the next object fits within the current span, step 318 places the object within the current span and step 320 adjusts the span. Adjusting the span can include, by way of example and not limitation, resizing the span or spans, renumbering the span or spans, or both. The method then returns to step 308 to ascertain whether additional objects remain to be placed within the bounding region.

If, on the other hand, the next object to be placed within the bounding region does not fit within the current span (the "no" branch in step 316), step 322 creates an empty space corresponding to the remaining span portion of the current span, and adjusts the span or spans. This can include renumbering the spans to maintain the left-to-right, top-to-bottom span sort.

Step 324 attempts to place the object within the next span. Step 326 ascertains whether the object fits within the next (or now, current) span. If not, the method returns to step 322. It is to be appreciated and understood, that step 322/324 can include ascertaining whether placement of the object relative to a next span would extend past the bottom of the bounding region. If so, the method can terminate. If, on the other hand, step 326 ascertains that the object can fit within the current span, the method branches to step 318 and places the object within the current span.

The method then continues until either all of the objects are placed within the bounding region or placing a particular object would extend past the bottom of the bounding region.

Look-Ahead

In the example above, the objects to be placed within the bounding region were defined in an ordered list. In at least some embodiments, it may be desirable to maintain the order of the objects as defined in the ordered list. However, in at least some embodiments, placement of the objects within the bounding region can occur in an order that departs from the object order as defined in the ordered list. For example, assume that the objects in the ordered list are raster images of individuals who appear in a contact list. The ordered list may define a desired order of contacts in terms of some parameter associated with the importance or relevance of the contacts. Yet, varying the order of the objects that appear in the ordered list, for purposes of placement within the bounding region, may still provide an acceptable or desirable user experience.

In at least some embodiments, if a particular object cannot fit within a current span, a look-ahead parameter can be utilized to search for objects in the list that can fit within the current span. The look-ahead parameter can define a next-number of objects in the list that are to be considered, e.g., the next three or four objects.

Object Re-Sizing

In at least some embodiments, it may be desirable to maintain, to the extent possible, the dimensions of the objects that are placed within the bounding region. In some instances, however, objects can be resized in order to enable the objects to be placed within a particular span in the bounding region or to more efficiently occupy the bounding region. For example, an object may be slightly larger than the remaining space in a span. In these instances, the size of the object might be reduced to fit within the remaining space in the span. Alternately or additionally, placement of an object within a particular span may leave a large empty space adjacent the object. In this case, the object might be expanded in size to more efficiently occupy the remaining space in the span so as to reduce the empty space.

Dropdown

In at least some embodiments, a side effect of the way objects are placed within a span is that the initial objects along the top edge of the bounding region tend to define a set of columns into which the remaining objects are placed. This has an undesirable impact of making the resulting collage of objects look non-random and making it more difficult to fit a variety of object sizes into those columns. To address this situation, a drop-down parameter can be utilized to enable spans to be merged when certain conditions are met. For example, one condition can be that the spans abut each other in the x-coordinate and are near each other in the y-coordinate. Nearness can be determined using any suitable approach. For example, nearness might be determined as a proportion of the size of an object.

Figure 4:
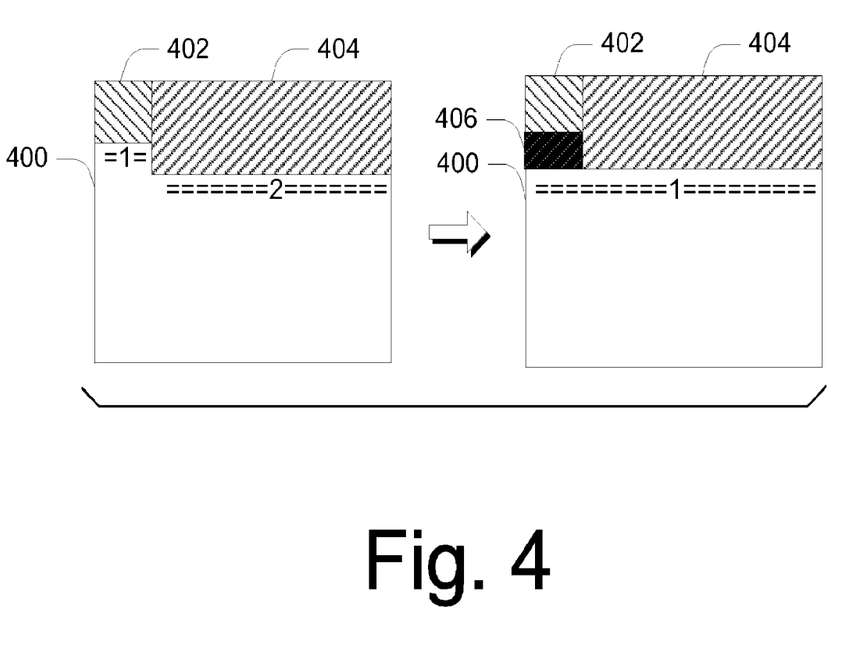
FIG. 4 illustrates an object placing operation in accordance with one or more embodiments.

As an example, consider FIG. 4. There, a bounding region 400 (the leftmost instance) includes two objects that have been placed therein—objects 402, 404. Notice that placement of the objects defines two spans. The spans are adjacent one another in the x-coordinate and are near one another in the y-coordinate. In the right-most instance of the bounding region 400, the spans have been merged and an empty space 406 has been inserted into the original first span.

Object Position Re-Distribution

In at least some embodiments, the positions of objects can be redistributed to more evenly, visually, distribute empty space within a bounding region. As an example, consider FIG. 5.

Figure 5:
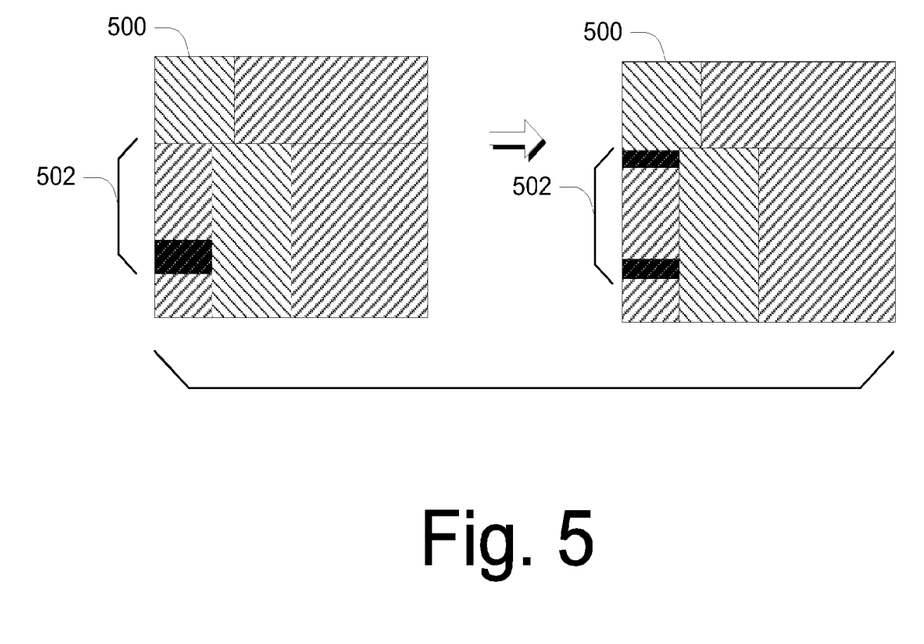
FIG. 5 illustrates an object placing operation in accordance with one or more embodiments.

There, a bounding region 500 is shown and includes a number of different objects that have been placed therein as indicated by the cross-hatched objects. Notice portion 502 in which an object and an empty space reside. The object appears above the empty space in this example. In at least some embodiments, the software code can detect that an empty space adjoins in either the x- or y-dimension. In some situations, the software code can then reposition the object into or relative to the empty space to more evenly distribute the empty space along both sides of the object.

As an example, consider the right-most bounding region 500. There, the corresponding object within portion 502 has been moved vertically downwardly so that an empty space appears both above and below the object.

Facial Recognition for Context-Sensitive Cropping

In at least some embodiments, objects, such as images, that are placed within the bounding region will include one or more faces. In some instances, it may be desirable to resize an object, as by reducing its size, in order for it to fit within the bounding region. In these instances, it may be desirable to maintain the integrity of the face or faces that appear in the object or image. As such, various facial recognition technologies can be utilized to recognize a face or faces within an image such that the object can be resized to preserve the integrity of the face or faces. For example, if an image is to be cropped, once a face is identified, the image can be cropped around the face so that when the image is placed within the bounding region, the face will appear intact.

Any suitable facial recognition technology can be used, as will be appreciated and understood by the skilled artisan.

Video

In some instances, it may be desirable to place an artifact, such as a thumbnail image, associated with a video object in the bounding region. In these cases, any suitable approach can be utilized to capture a thumbnail image from the video object and incorporate that thumbnail image in the bounding region as described above.

Threshold Tolerance and Outcome Measurement

In some scenarios, there can be multiple layout solutions in which objects can be laid out in the bounding region in different orders and sizes, with preferential ordering, with different distributions of empty spaces, and/or with different degrees of applied rules. For example, a cropping rule may have a tunable parameter that crops from between one percent to no more than five percent. Each of these different layout solutions can have an outcome measurement associated with it. The outcome measurement can be a measure of the desirability of any one particular layout solution. For example, there may be 10 different layout solutions for a particular collection of objects for a specific bounding region. The layout solutions may have outcome measurements from "1" to "10", with "1" being most desirable. In this instance a threshold can be set to rule out less-than-desirable layout solutions. For example, any layout solution with an outcome measurement higher than "3" is ruled out. If only one layout solution has an outcome measurement lower than "3", e.g., "1", then this layout solution is selected. Other approaches can be used when more than one layout solution satisfies the threshold.

It is to be appreciated and understood than any and/or all of the above described approaches can be utilized when placing objects within a bounding region. For example, one object-placing approach may utilize, in combination with the span-based approach, the look-ahead and object re-sizing features. Yet another object-placing approach may utilize, in combination with the span-based approach, the object re-sizing, dropdown, and object position redistribution features. Needless to say, any suitable combination of these features can be utilized without departing from the spirit and scope of the claimed subject matter.

Example System

Figure 6:
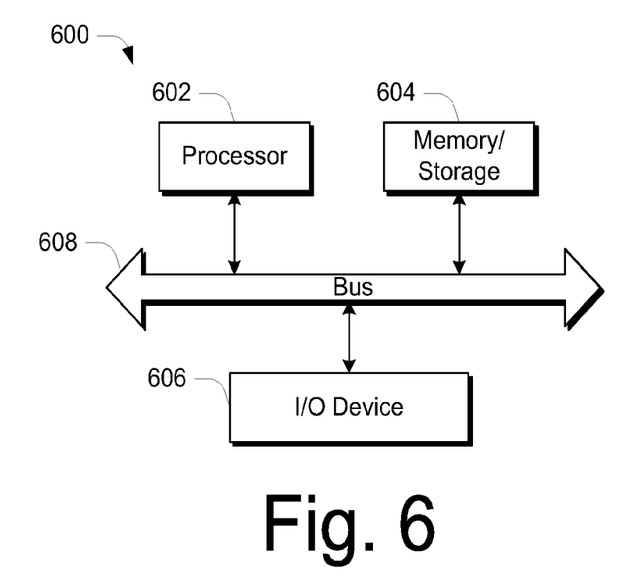
FIG. 6 illustrates an example system that can be used to implement one or more embodiments.

FIG. 6 illustrates an example computing device 600 that can be used to implement the various embodiments described above. Computing device 600 can be, for example, computing device 102 or Web server 114 of FIG. 1.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or non-volatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable visual elements or objects, such as two-dimensional raster images, to be packed into a bounding region, such as a rectangular bounding region, in a manner that reduces wasted space. In at least some embodiments, a two-dimensional object packing component attempts to fit individual objects into the bounding region. The two-dimensional object packing component utilizes a span list to keep track of available space by tracking spans within the bounding region. Spans can occur laterally-adjacent placed objects and/or adjacent a placed object's bottom edge. In one or more embodiments, the span list is sorted left-to-right, top-to-bottom.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
defining, using a computing device, a single bounding region;
obtaining, using the computing device, an ordered list of objects to be placed within the bounding region, an object being a two-dimensional image;
defining, using the computing device, a first span within the bounding region, a span occurring laterally adjacent a placed object or an edge of the bounding region and vertically adjacent a placed object's bottom edge or an edge of the bounding region;

placing, using the computing device, a first object from the ordered list of objects within the first span;

adjusting, using the computing device, the first span responsive to placing the first object, so that the first span does not include the area occupied by the first object;

defining, using the computing device, a second span within the bounding region responsive to placing the first object;

obtaining, using the computing device, a next object to be placed within the bounding region;

if the next object will fit within the first span:
  placing, using the computing device, the next object in the first span;
  adjusting, using the computing device, the first span and the second span responsive to placing the next object, so that the first span and the second span do not include the area occupied by the next object;

if the next object will not fit within the first span:
  creating, using the computing device, an empty space within the first span;
  redefining, using the computing device, the first span to not be a span;
  redefining, using the computing device, the second span to be the first span; and
  attempting to place the next object within the redefined first span.

2. The computer-implemented method of claim 1 further comprising creating an empty space corresponding to the redefined first span if the next object will not fit within the redefined first span.

3. The computer-implemented method of claim 1 further comprising maintaining a span list comprising multiple spans and wherein adjusting the first span comprises one or more of resizing the first span or re-numbering spans in the span list.

4. The computer-implemented method of claim 1 further comprising maintaining a span list comprising multiple spans and wherein adjusting the first span comprises one or more of resizing the first span or re-numbering spans in the span list, and wherein re-numbering the spans comprises re-numbering the spans to maintain a left-to-right, top-to-bottom span sort.

5. The computer-implemented method of claim 1 further comprising using a span list to attempt to place additional objects in the bounding region until either all objects on the ordered list are placed in the bounding region or placing a particular object would extend past a bottom of the bounding region.

6. The computer-implemented method of claim 1, wherein the objects comprise two-dimensional raster images.

7. One or more computer-readable storage memories embodying a two-dimensional object packing component configured to:
  use a span list including a list of spans within a defined single bounding region sorted in a left-to-right, top-to-bottom order to place objects within the bounding region, wherein spans are defined, during object placement, laterally adjacent at least some placed objects and adjacent bottom edges of at least some other objects, an object being a two-dimensional image;
  responsive to the placement of an object, redefine the spans so that no spans include any area occupied by an object; and
  perform at least one of the following in an attempt to place objects within the bounding region:
    in an event that an object appearing in an ordered list will not fit within a span, looking ahead in the ordered list to attempt to find an object that will fit within the span and placing that object within the span;
    re-sizing an object that is to be placed within the bounding region, and using facial recognition technology to recognize a face within an object so that resizing the object will preserve the integrity of the face; or
    merging spans when at least one condition is met.

8. The one or more computer-readable storage memories of claim 7, wherein looking ahead comprises using a look-ahead parameter to define a next-number of objects in the ordered list that are to be considered.

9. The one or more computer-readable storage memories of claim 7, wherein re-sizing an object comprises reducing an object's size.

10. The one or more computer-readable storage memories of claim 7, wherein said at least one condition is that two spans to be merged abut each other in an x-coordinate.

11. The one or more computer-readable storage memories of claim 7, wherein said at least one condition is that two spans to be merged abut each other in an x-coordinate, and wherein said at least one condition is further that the two spans are near each other in a y-coordinate.

12. The one or more computer-readable storage memories of claim 7, wherein the objects comprise two-dimensional raster images.

13. The one or more computer-readable storage memories of claim 7, wherein the two-dimensional object packing component is configured to create an empty space corresponding to span portion in an event that an object cannot fit within the span portion.

14. The one or more computer-readable storage memories of claim 7, wherein the two-dimensional object packing component is configured to maintain the span list by re-numbering spans in the span list to maintain the left-to-right, top-to-bottom span sort.

15. One or more computer-readable storage memories embodying computer-readable instructions which, when executed, implement a method comprising:
  defining a single bounding region;
  obtaining an ordered list of objects to be placed within the bounding region, an object being a two-dimensional image;
  defining a first span within the bounding region, a span occurring laterally adjacent a placed object or an edge of the bounding region and vertically adjacent a place object's bottom edge or an edge of the bounding region;
  placing a first object from the ordered list of objects within the first span;
  adjusting the first span responsive to placing the first object, so that the first span does not include the area occupied by the first object;
  defining a second span within the bounding region responsive to placing the first object;
  obtaining a next object to be placed within the bounding region;
  if the next object will fit within the first span:
    placing the next object in the first span;
    adjusting the first span and the second span responsive to placing the next object, so that the first span and the second span do not include the area occupied by the next object;
  if the next object will not fit within the first span:
    creating an empty space within the first span;
    redefining the first span to not be a span;
    redefining the second span to be the first span; and
    attempting to place the next object within the redefined first span.

16. The one or more computer-readable storage memories of claim 15, further comprising creating an empty space corresponding to the next span if the next object will not fit within the next span.

17. The one or more computer-readable storage memories of claim 15, further comprising maintaining a span list comprising multiple spans and wherein adjusting the first span comprises one or more of resizing the first span or re-numbering spans in the span list.

18. The one or more computer-readable storage memories of claim 15, further comprising maintaining a span list comprising multiple spans and wherein adjusting the first span comprises one or more of resizing the first span or re-numbering spans in the span list, and wherein re-numbering the spans comprises re-numbering the spans to maintain a left-to-right, top-to-bottom span sort.

19. The one or more computer-readable storage memories of claim 15, further comprising using the span list to attempt to place additional objects in the bounding region until either all objects on the ordered list are placed in the bounding region or placing a particular object would extend past a bottom of the bounding region.

20. The one or more computer-readable storage memories of claim 15, wherein the objects comprise two-dimensional raster images.

* * * * *